United States Patent [19]

Nilsson et al.

[11] Patent Number: 4,894,575
[45] Date of Patent: Jan. 16, 1990

[54] BOLTED SPHERICAL SERIES/PHASE GENERATOR CONNECTIONS

[75] Inventors: Lennart S. Nilsson, Winter Springs; John M. Butler, III, Orlando; Hector O. Ponce, Pensacola; Darrell R. Morrison, Orlando, all of Fla.

[73] Assignee: Westinghouse Electric Corp., Pittsburgh, Pa.

[21] Appl. No.: 268,103

[22] Filed: Nov. 7, 1988

[51] Int. Cl.[4] ............... H02K 3/46; H02K 3/50; H01R 4/28
[52] U.S. Cl. .................... 310/260; 310/71; 310/91; 439/798
[58] Field of Search ............ 29/596; 310/42, 71, 310/91, 260; 248/74.4, 231.6, 316.6; 439/798

[56] References Cited

U.S. PATENT DOCUMENTS

| | | | |
|---|---|---|---|
| 3,740,692 | 6/1973 | Filhaber | 439/798 |
| 4,385,254 | 5/1983 | Vakser et al. | 310/260 |
| 4,806,807 | 2/1989 | Levino | 310/260 |

FOREIGN PATENT DOCUMENTS 44811  11/1948  France ................. 439/798

Primary Examiner—Patrick R. Salce
Assistant Examiner—D. L. Rebsch
Attorney, Agent, or Firm—M. G. Panian

[57] ABSTRACT

An electrical generator connection, to connect coil ends, and a method of making the same. A header cap having a spherically shaped portion is brazed to each coil end to be connected. A pair of connector bars, each having a pair of similarly sized spherical seats, receives the spherical portion of each coil end header cap. Electrical and mechanical connection is provided by bolting the two connector bars together.

4 Claims, 2 Drawing Sheets

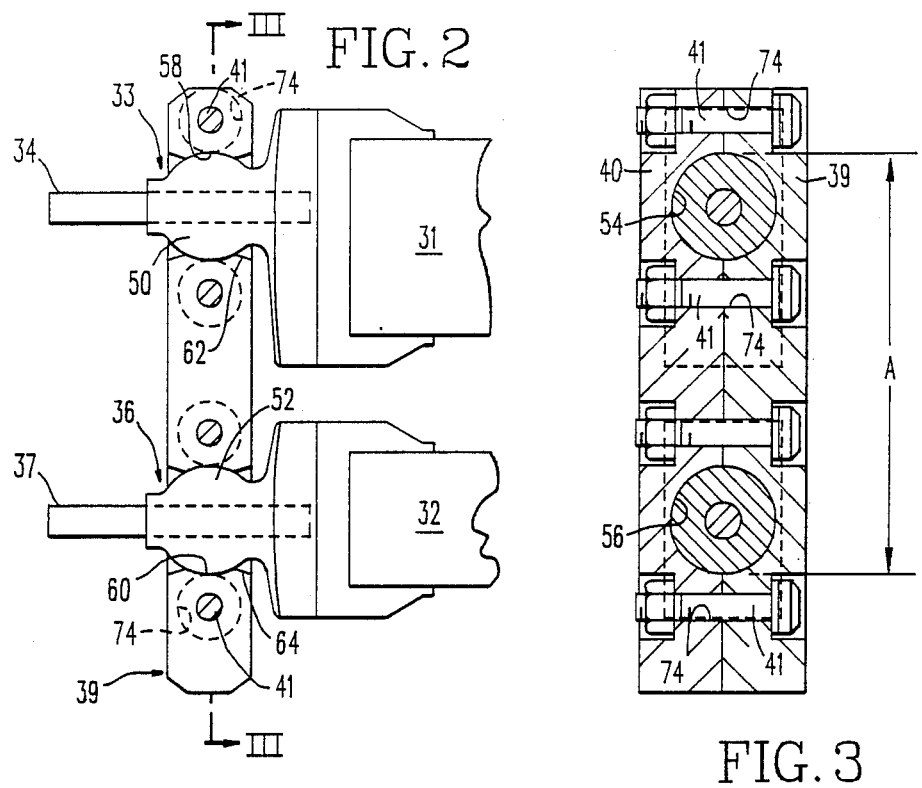
FIG. 2
FIG. 3
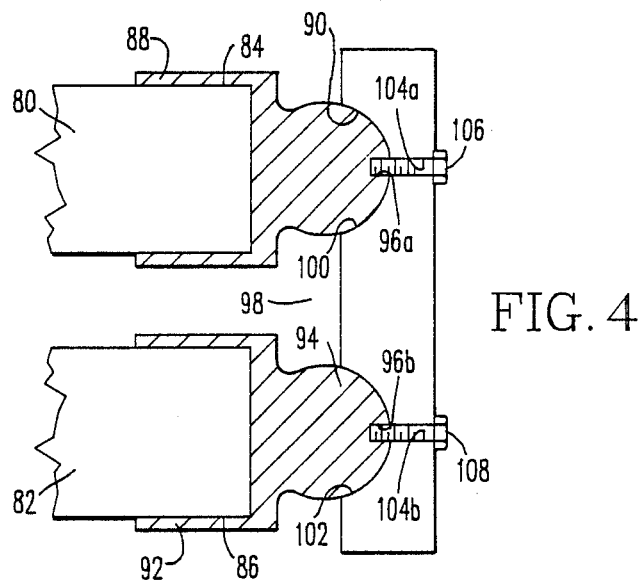
FIG. 4

BOLTED SPHERICAL SERIES/PHASE GENERATOR CONNECTIONS

BACKGROUND OF THE INVENTION

1. Field of the Invention

This invention relates to series and phase connectors for turbine generators, and in particular to connectors having spherical geometry for making electrical connections in turbine generators.

2. Description of the Prior Art

The environment of the instant invention is that of large electrical generators, e.g., generators driven by turbines in a nuclear or other commercial power generating plant. The size and geometry of such generators requires that in installing or replacing the stator coils, the coils must be placed in sections, or halves, and after they are in place, those sections must be connected at their ends. Similarly, connections are required between the ends of each phase coil and the parallel phase ring which circles around the end of the generator stator. Maintaining good series and phase connections between coil ends has always been an important consideration from both a mechanical and a electrical standpoint.

U.S. Pat. No. 4,385,254 issued to Vakser et al discloses end connectors for the stator of an electric machine. In Vakser, a pair of end portions of bars 1 are connected by an end connection 11. The end of each bar 1 is received by a corresponding portion of the end connection. The connection between a pair of end portions are formed by a clamp which encompass bosses of each bar.

SUMMARY OF THE INVENTION

It is an object of this invention to provide an improved connector for making electrical connection between series and phase coil sections of an electrical power generator.

It is another object of this invention to provide a connector which will provide complete contact between the connector and the coils despite severe coil end misalignment.

It is yet another object of this invention to provide an improved method for making electrical connection between coil sections of an electrical power generator which will provide complete contact between the connector and the coil.

In accordance with the above objects, there is provided an improved electrical generator and method of making same, the electrical generator having connectors which connect coil ends. A header cap having a spherically shaped portion is brazed to each coil end to be connected. A pair of connector bars, each provided with a pair of similarly sized spherical seats such that the pair of connector bars define a pair of spherical sockets, receives the spherical portion of each coil end head cap. Electrical and mechanical connection is then provided by bolting the two connector bars together.

In a second embodiment of the invention, each coil end to be connected has a header cap with a spherically shaped end brazed thereto. A single connector bar having a pair of spherically shaped detents for receiving the spherical ends of the header caps is then bolted to the header caps by a pair of bolts, each of which pass through the connector bar and a spherical end of a header cap.

Brief Description of the Drawings

FIG. 2 is a side view of a pair of coil section ends and the connector of the present invention in place.

FIG. 3 is a front view of the pair of coil section ends and connector of FIG. 2.

FIG. 4 is a side view of a pair of coil ends and a connector in accordance with a second embodiment of the present invention for connecting the pair of coil ends.

DESCRIPTION OF THE PREFERRED EMBODIMENTS

Figure 1:
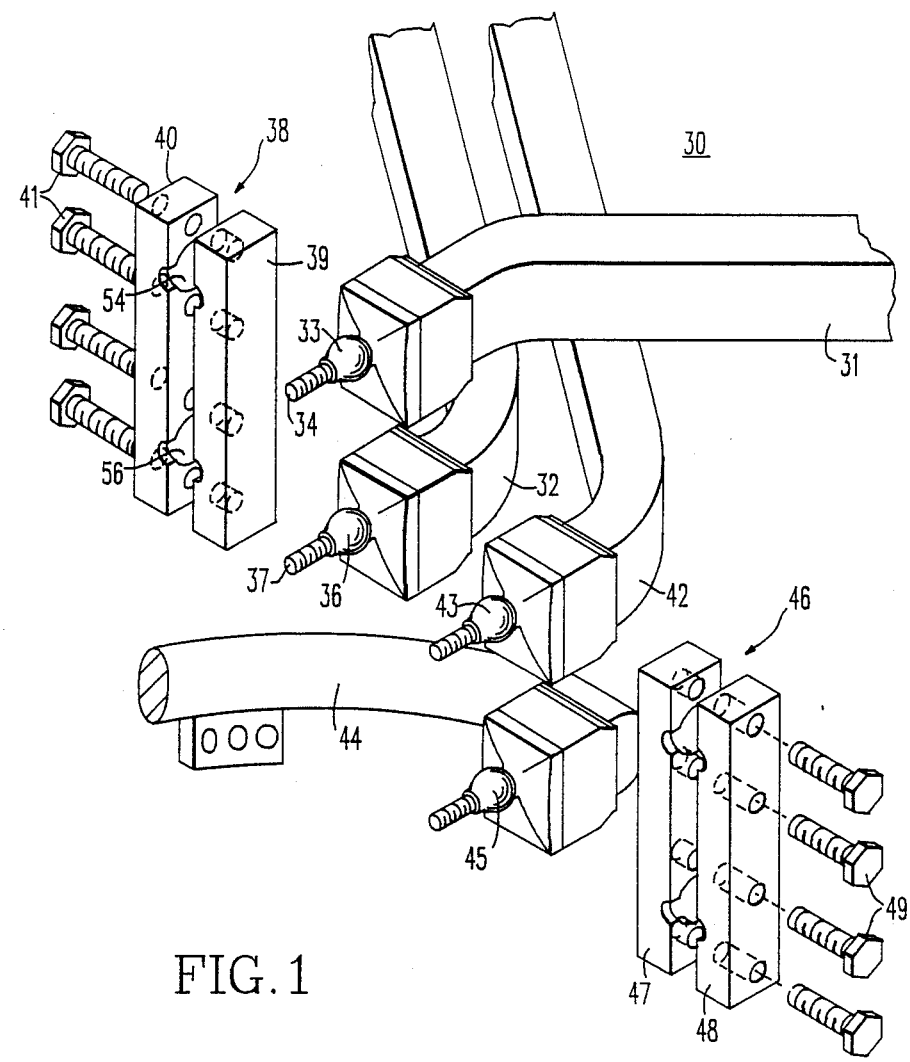
FIG. 1 is a perspective view of a generator stator showing the ends of a pair of coil sections and a connector in accordance with the present end invention for connecting such ends; the view also shows a phase coil end, a parallel phase ring and a connector for connecting the phase coil and the parallel ring.

As used in the following description, connection of coil ends refers to the connection of ends of coil halves or sections, as well as the connection of coil ends to phase rings. Further, as used in the specification and claims which follow, the phrase coil ends embraces both coil ends and the headers of the generator phase parallel ring.

Turning first to FIG. 1, there is shown a diagrammatic view of the ends of a pair of coil sections of a generator stator, and the manner of connecting those ends in accordance with the present invention. FIG. 1 also shows an end of a phase coil and its connection to a parallel phase ring, also in accordance with the teachings of the present invention. These coils are, as is well known in the art, portions of a generator stator 30 of a large generator used, for example, in a nuclear powered generating plant. The top coil section 31, which is a first half of a coil loop, is shown as terminating in a top coil header cap 33. A top coil water hose nipple 34 is brazed onto and extends outward from top header cap 33. Water hose nipple 34 receives a water hose (not shown) for communicating water to the interior of the coil for cooling purposes. Similarly, bottom coil section 32 terminates in a bottom coil header cap 36 with bottom water hose nipple brazen onto bottom coil header cap 36. Connector means 38, which comprises first connector bar 39 and second connector bar 40, snugly receives header caps 33 and 36 to thereby provide a secure mechanical and electrical connection between the top coil section 31 and bottom coil section 32 of the coil loop. Bolts 41 tighten first connector bar 39 and second connector bar 40 together to tighten the fit around header caps 33 and 36. Similarly, bottom phase coil 42 is shown having header cap 43 attached thereto and parallel phase ring 44 is illustrated having header cap 45 attached thereto. Connector means 46, which comprises first connector bar 47 and second connector bar 48, is positioned to provide an integral mechanical and electrical contact between bottom phase coil 42 and parallel phase ring 44. Bolts 49 tighten first connector bar 47 and second connector bar 48 to tighten the fit around header caps 43 and 45.

Turning next to FIG. 2, the electrical/mechanical connection between top coil section 31 and bottom coil section 32 is now described in greater detail. Both top coil header cap 33 and bottom coil header cap 36 are provided with spherically shaped central portions 50 and 52 respectively. Each connector bar 39, 40 includes a top detent 54 and a bottom detent 56 for receiving top coil header cap 33 and bottom coil header cap 36 respectively. Detents 54, 56 each include a spherically shaped seat portion 58, 60, respectively, for receiving part of the spherical central portions 50, 52. In order to maintain a good electrical/mechanical connection between top coil section 31 and bottom coil section 32 while allowing for coil misalignment, each detent 54, 56 is provided with widened portions 62, 64, respectively, which provides a small gap between detents 54, 56 and corresponding parts of spherically shaped central portions 50, 52.

First and second connector bars 39, 40 are securely attached to each other by clamping means such as bolts 41. In the preferred embodiment of the invention shown in FIG. 2, each connector bar 39, 40 is provided with a pair of bolt receiving openings 74 proximate to each coil 31, 32. A bolt 41 passes through corresponding openings in first connector bar 39 and connector bar 40 to secure the bars together. In such a manner, first and second connector bars 39 and 40 are connected to provide a snug fit.

Turning next to FIG. 3, a cross-sectional view is taken along lines 3—3 of FIG. 2 to illustrate the attachment of connector bar 39 to connector bar 40 utilizing bolts 41 which extend through bolt receiving openings 74 to clamp connector bars 39, 40 together. FIG. 3 also shows Dimension "A" which is the maximum distance between the spherical portion 58 of top detent 54 and the spherical portion 60 of bottom detent 56.

The method of connecting top coil section 31 and bottom coil section 32, or alternately, the method of connecting bottom phase coil 41 with parallel phase ring 43 is now described. Connection will commence with the installation of top and bottom coil sections 31, 32, or bottom phase coil 41 and parallel phase ring 43 in a turbine generator of conventional design.

First, two series coils 31, 32 or one phase coil 42 and a parallel ring lead 44 are installed in turbine generator 30. Each coil 31, 32, 42 and/or ring lead 44 should have a header cap 33 having a central spherical portion 50 brazed onto its end. Next, the furthest distance between any part of spherical portion 50 of top header cap 33 and any part of spherical part 52 of bottom header cap 36 is measured. As previously mentioned, this distance is shown in FIG. 3 as distance "A". A first connector bar 39 and a second connector bar 40, each having a single detent 54 previously machined, is provided. A second detent 56 of similar size and dimension as first detent 54 is then machined into each connector bar 39, 40 such that the corresponding points along detents 54, 56 are separated by distance "A" as well. To ensure accuracy in dimensioning machined detent 56, detent 56 may be compared to a reference sphere of the desired dimensions. Next, to ensure a high quality electrical connection, the surfaces of connection bars 39 and 40 which contact the spherical portions 50, 52 of header caps 33, 36 are plated with silver. Connection means 38 is then assembled by placing connection bars 39, 40 together such that the spherical portions 50, 52 of header caps 33, 36 fit snugly within the spherical opening which is defined by detents 54, 56. Clamping bolts 41, which may be for example ½" bolts made of a high strength stainless steel, are inserted through bolt receiving openings 74 to firmly attach the first connection bar 39 and the second connection bar 40 together. Clamping bolts 41 are then tightened to 10,000 lbs. clamping force to secure the connection between the two.

Turning next to FIG. 4, yet another embodiment of the invention is hereby described. Here, first coil 80 and second coil 82 terminate in coil ends 84 and 86, respectively. First header cap 88, which includes a spherically shaped end 90 is brazed onto coil end 84. Similarly, second header cap 92, which includes a spherically shaped end 94, is brazed onto coil end 86. Each spherically shaped end 90, 94 includes a bolt receiving opening 96a, 96b, respectively, for securing the connection between coil ends. Connecting bar 98 is provided with a first and second spherically shaped seats 100, 102. Each seat 100, 102 is sized to receiving the corresponding one of spherically shaped ends 90, 94. Connecting bar 98 is also provided with bolt receiving openings 104a and 104b. Bolt 106 is inserted through openings 104a and 96a to secure connecting bar 98 and header cap 88. Similarly, bolt 108 is inserted through openings 104b and 96b to secure connecting bar 98 and header cap 92.

The method of connecting first coil 80 and second coil 82 is next described. Connection will commence with the installation of first and second coils 80, 82 in a turbine generator of conventional design. Header caps 88, 92 having spherically shaped ends 90, 94 are soldered or brazed onto the ends 84, 86 of each coil 80, 82, respectively. A connecting bar 98 having a pair of spherical seats 100, 102 of dimensions similar to spherically shaped ends 90, 94 is placed onto spherical ends 90, 94. Connecting bar 98 is then secured to header caps 88, 92 by inserting first bolt 106 through connection bar bolt receiving opening 104a and header cap bolt receiving opening 96a to secure connecting bar 98 and first header cap 88 together. Similarly, second bolt 108 is inserted through bolt receiving openings 104b and 96b to secure connecting bar 98 and second header cap 92 together. Header caps 88, 92 are then permanently secured to connecting bar 98 by brazing. Bolts 106 and 108 may then be removed.

Thus, there has been described and claimed herein connectors spherical connectors for connecting the ends of a pair of coils. There has further been described a method of making electrical and mechanical connection between coil ends. However those skilled in the art will recognize that numerous modifications and variations besides those specifically set forth may be made in the techniques described herein without departing substantially from the concept of the present invention. Accordingly, it should be clearly understood that the form of the invention described herein is exemplary only, and is not intended as a limitation on the scope of the claims.

We claim as our invention:

1. An electrical generator comprising connectors which connect coil ends, said coil ends having a spacing therebetween and respective axes of projection, each of said connectors being characterized by:

first and second header caps having a predetermined geometry attached to respective ends of a pair of coil sections;

a first connector bar of a conductive material, said first bar having two detents of a spacing equal to said coil end spacing, said first connector bar detents having a respective axis corresponding to said axis of projection;

a second connector bar of a conductive material, said second bar having two detents of a spacing equal to said coil end spacing, said second connector bar detents having a respective axis corresponding to said axis of projection;

said first connector bar detents and said second connector bar detents defining two openings of a geometry complimentary to said predetermined geometry and a spacing equal to said coil end spacing;

wherein said first and second header caps include a projecting spherical part, said first and said second connector bar detents each including a spherically shaped seat having widened portions at the periphery thereof, whereby said defined openings include spherically shaped portions for receiving said projecting spherical parts of said header caps; and clamping means for clamping said first and second connector bars together so that said header caps are tightly received in said defined openings.

2. The electrical generator as described in claim 1, further comprising a respective water hose nipple integrally connected to each of said header caps.

3. In an electrical generator having stator coil sections, connectors connecting pairs of said coil sections at their ends, said ends having a spacing therebetween and respective axes of projection, and means for mechanically connecting at least one of said connectors to the end of each coil section of its pair, the improvement wherein at least one of said connectors comprises a solid bar of a conductive material, said bar having two detents of a spacing equal to said coil end spacing, said detents having an axis corresponding to said axis of projection, said coil ends each having a header cap terminating in a spherical portion, each of said detents tightly receiving said predetermined geometry portion of one of said header caps.

4. The electrical generator as described in claim 3, wherein said mechanical means comprise a pair of bolts, each bolt corresponding to one of said header caps, wherein each of said spherical geometry portions is provided with a bolt receiving opening and said connector bar is provided with a pair of bolt receiving openings, each bolt receiving opening passing through one of said detents, said bolts securing said bar to said header caps.

* * * * *